United States Patent
Haverlag et al.

(10) Patent No.: US 12,432,136 B2
(45) Date of Patent: Sep. 30, 2025

(54) WIRELESS CONTROL SYSTEM BASED ON A HYBRID NETWORK

(71) Applicant: SIGNIFY HOLDING B.V., Eindhoven (NL)

(72) Inventors: Marco Haverlag, Mierlo (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 534 days.

(21) Appl. No.: 17/791,434

(22) PCT Filed: Jan. 5, 2021

(86) PCT No.: PCT/EP2021/050084
§ 371 (c)(1),
(2) Date: Jul. 7, 2022

(87) PCT Pub. No.: WO2021/144166
PCT Pub. Date: Jul. 22, 2021

(65) Prior Publication Data
US 2023/0039921 A1 Feb. 9, 2023

(30) Foreign Application Priority Data
Jan. 14, 2020 (EP) .................... 20151747

(51) Int. Cl.
*H04W 40/24* (2009.01)
*H04L 45/00* (2022.01)
(Continued)

(52) U.S. Cl.
CPC ............. *H04L 45/34* (2013.01); *H04L 45/04* (2013.01); *H04L 45/48* (2013.01); *H04W 40/24* (2013.01)

(58) Field of Classification Search
CPC ......... H04L 45/34; H04L 45/04; H04L 45/48; H04L 45/52; H04W 40/24
See application file for complete search history.

(56) References Cited

U.S. PATENT DOCUMENTS

| | | | |
|---|---|---|---|
| 7,542,478 B1 * | 6/2009 | Ozer | H04W 48/08 370/447 |
| 7,924,747 B2 | 4/2011 | McNeill et al. | |
| (Continued) | | | |

FOREIGN PATENT DOCUMENTS

| | | |
|---|---|---|
| JP | 2017060034 A | 3/2017 |
| JP | 2019033325 A | 2/2019 |

OTHER PUBLICATIONS

P. Baronti, et al., "Wireless Sensor Networks: A Survey on the State of the Art and the 802.15.4 and ZigBee Standards", ScienceDirect, Computer Communications 30, 2007, pp. 1655-1695.
(Continued)

*Primary Examiner* — Atique Ahmed

(57) ABSTRACT

To improve the efficiency and reliability of communication, such as for control commands distribution and data collection, in a large and high density wireless control system (100), each one of a plurality of nodes in the system is assigned one out of three roles, a router node (200), a non-router node (300), or a data collector node (400). A node (200, 300, 400) in the wireless control system (100) is capable to operate according to at least one of two communication protocols. A first communication protocol is capable to support mesh or tree network with multi-hop routing, while a second communication protocol is capable to support a star network with point-to-point connection. The router nodes build up a sparse multi-hop network to guarantee the connectivity of the large-scale network. Around each router node within one-hop direct link, a local
(Continued)

star network is built up with at least one non-router node and at least one data collector node.

16 Claims, 6 Drawing Sheets

(51) Int. Cl.
 *H04L 45/02* (2022.01)
 *H04L 45/48* (2022.01)

(56) References Cited

U.S. PATENT DOCUMENTS

| | | |
|---|---|---|
| 8,730,838 B2 | 5/2014 | Liang et al. |
| 9,277,586 B2 | 3/2016 | Orten et al. |
| 9,866,395 B2 | 1/2018 | Bruestle et al. |
| 10,991,242 B2* | 4/2021 | Taylor ............... H04Q 9/00 |
| 2007/0255640 A1* | 11/2007 | Gumaste ........... H04J 14/0238 705/37 |
| 2008/0215700 A1* | 9/2008 | Pillar ................. B65F 3/045 709/212 |
| 2011/0216656 A1* | 9/2011 | Pratt, Jr. ............ H04L 45/34 370/400 |
| 2014/0321324 A1* | 10/2014 | Beshai ............... H04L 49/103 370/254 |
| 2017/0134395 A1* | 5/2017 | Enns ................. H04L 63/126 |
| 2017/0281822 A1* | 10/2017 | Becker ............... B05B 12/08 |
| 2020/0305062 A1* | 9/2020 | Kharvar ............. H04W 84/18 |
| 2021/0195442 A1* | 6/2021 | Agarwal ............ H04W 24/02 |
| 2021/0266346 A1* | 8/2021 | Gordon ............. H04L 63/0245 |
| 2021/0274315 A1* | 9/2021 | Daoura .............. H04W 4/38 |

OTHER PUBLICATIONS

J. Yang, et al., "BlueNet: BLE-Based Ad-Hoc Communications Without Predefined Roles", Computer Science and Engineering University of Notre Dame, Notre Dame, Indiana; Research and Advanced Engineering Ford Motor Company, Dearborn, Michigan, 2017, pp. 1-8.

* cited by examiner

WIRELESS CONTROL SYSTEM BASED ON A HYBRID NETWORK

CROSS-REFERENCE TO PRIOR APPLICATIONS

This application is the U.S. National Phase application under 35 U.S.C. § 371 of International Application No. PCT/EP2021/050084, filed on Jan. 5, 2021, which claims the benefit of European Patent Application No. 20151747.1, filed on Jan. 14, 2020. These applications are hereby incorporated by reference herein.

FIELD OF THE INVENTION

The invention relates to the field of wireless control systems. More particularly, various methods, apparatus, systems and computer-readable media are disclosed herein related to a wireless control system for distributing control commands to and forwarding information from a plurality of nodes using a hybrid network topology approach.

BACKGROUND OF THE INVENTION

There is an ongoing trend in the professional lighting market to move more and more towards connected lighting systems, which enable all kinds of new features like (remote) scheduling, energy monitoring, sensor-based lighting control and asset management. In many cases these systems are installed in existing buildings, in which cases a wireless network is preferred to avoid having to deploy new cables (for lighting control) through the ceiling. Examples of such wireless network protocols which are used widely in current practice are open standards like Zigbee, Thread, BLE, BLE mesh, Wi-Fi, Wi-Fi direct, and various proprietary network implementations built on top of the IEEE 802.15.4, IEEE 802.15.1 or IEEE 802.11 standards.

In many cases the network can be so large that not all nodes can be reached with a direct link from a central controller, and thus those remote nodes may need the help from one or multiple relaying nodes. A flooding-based routing approach is widely used to distribute control messages to a large number of nodes. A message is broadcasted and received by many nodes at the same time, and if each node repeats the message a few times, the probability of missing the message becomes low enough to be acceptable. Depending on the size and density of the network the number of repeats can be configured (in some networks), in order to restrain the 'network storm' that results from a broadcast. Without such restraint, each node would typically resend the message a limited number of times. Otherwise, a single broadcast message in a 200-node network may easily lead to tens of thousands of re-transmissions.

However, for a control system comprising a large number of nodes deployed with a high node density, collisions occur because many nodes are in direct communication range. Such flooding-based routing may not be very efficient.

SUMMARY OF THE INVENTION

In view of the above, the present disclosure is directed to methods, apparatus, systems, computer program and computer-readable media for providing a mechanism related to a wireless control network system for distributing information to and forwarding information from a large number of nodes in a more efficient and reliable manner. Thus, the control system is exercised in a wireless communication network. More particularly, the goal of this invention is achieved by a wireless control system as claimed in claim 1, by a node out of a plurality of nodes in a wireless control system as claimed in claim 12, by a method of a wireless control system as claimed in claim 13, by a method of a node as claimed in claim 14, by a distributed computer program of the system as claimed in claim 15, and by a computer program of the node as claimed in claim 16.

Accordingly, in order to improve the efficiency and reliability in information distribution and collection in a large and dense network, a hybrid network topology with a combination of mesh and star topology, is constructed by leveraging two different communication protocols, a first communication protocol and a second communication protocol, and assigning each one of a plurality of nodes one out of three different roles. The first communication protocol has multi-hop routing capability, and the second communication protocol supports point-to-point connections. By leveraging the two communication protocols in the hybrid network topology, a more efficient communication manner is achieved. Preferably, different frequency allocation schemes are used by different communication protocols, and thus more concurrent communications may take place on different frequency bands/channels according to the two different communication protocols.

In accordance with a first aspect of the invention a wireless control system is provided. The wireless control system comprises a plurality of nodes configured to operate according to at least one of a first communication protocol capable to support a mesh or tree network with multi-hop routing; and a second communication protocol capable to support a star network with a point-to-point connection. Each node of the plurality of nodes is assigned one out of three roles, and each of the three roles is assigned to at least one node out of the plurality of nodes, the three roles being:

a first role wherein the node is configured to operate in a first mode according to the first communication protocol wherein a routing capability of the node is enabled, and the node is operable to distribute a control command to the plurality of nodes and to forward status information received from the plurality of nodes, via multi-hop routing;

a second role wherein the node is configured to operate both in a second mode according to the first communication protocol wherein the routing capability of the node is disabled, and the node is operable to receive a control command broadcast by another node out of the plurality of nodes by means of a one-hop direct link; and in a third mode according to the second communication protocol, wherein the node is operable to send status information to one or more nodes out of the plurality of nodes; and a third role wherein the node is configured to operate both in a fourth mode according to the second communication protocol, wherein the node is operable to receive status information from one or more nodes out of the plurality of nodes by means of a point-to-point connection; and in a fifth mode according to the first communication protocol, wherein the node is operable to send aggregated status information, received in the fourth mode from the one or more nodes, to a parent node out of the plurality of nodes by means of a one-hop direct link; and wherein the parent node is a node assigned the first role or a node assigned the second role.

In one example, the wireless control system may be a one-to-many network with a central controller or a gateway device and a plurality of nodes to be controlled. The control commands distributed on the network may come from the central controller locally or from the cloud via the gateway device. The central controller or the gateway device is to send out control commands in a centralized manner to the large distributed network. In return, the plurality of nodes in the large distributed network are configured to provide feedback to the central controller or the cloud with status information related to functional devices or actuators controlled by the central controller or the cloud. There may be other sensors, besides actuators, co-located with the plurality of nodes. Thus, the status information may also comprise sensing data from the other sensors, such as data related to temperature, humidity, and etc. Therefore, in one preferred example, the communication in the system can be one-to-many or many-to-one.

A node assigned the first role acts as a router node according to the first communication protocol. With the multi-hop routing capability enabled, the router nodes are configured to relay control commands and status information or sensing data in a bidirectional manner to and from the plurality of nodes. A node assigned the second role acts as a non-router node, by operating mainly according to the first communication protocol with the routing capability disabled. A non-router node detects control commands broadcast by a node assigned the first role with a one-hop direct link and sends out its own status information or sensing data via a point-to-point connection according to the second communication protocol. Here a point-to-point connection is considered to also cover a point-to-multipoint connection. A node assigned the third role acts as a data-collector node. A data-collector node operates mainly according to the second communication protocol to collect status information or sensing data from one or more nodes in the surroundings. The data-collector node aggregates the collected information or data during a certain time period and thereafter in a single data packet preferably sends it to a parent node using a one-hop direct link. The time period may be determined according to the size of the collected status information or sensing data, or the capacity of a single data packet, or the latency requirement on collecting such information or data. Given that typical status information and sensing data have a relatively low data rate as compared to the network capacity, but may be of quite critical latency requirements, aggregating information and data from multiple nodes in a single data packet can make the transmission more efficient in a large network according to the first communication network, in terms of reduced packet overhead, such as a packet header, and reduced potential collision among multiple simultaneous transmissions.

By assigning one role out of the three roles to each one of the plurality of nodes, the original large dense network turns into a sparse multi-hop network in view of the first communication protocol. The sparse multi-hop network comprises mainly the nodes assigned the first role, or the router nodes, which stay in the first mode most of the time. Around each router node a local star network is built up with nodes assigned either the second or the third role, which communicate either via a one-hop direct link according to the first communication protocol, or a point-to-point or point-to-multipoint connection according to the second communication protocol. Thus, a hybrid network topology is constructed in the wireless control system by leveraging two communication protocols and assigning a certain role out of three roles to an individual node.

Note that the collision of packets in the sparse multi-hop network should be limited as much as possible, because those packets may have been propagated along a long path, and it can be quite resource consuming to retransmit such packets, in terms of both network bandwidth and power consumption. By reducing the number of nodes participating in the multi-hop relaying, collisions in the sparse network according to the first communication protocol are greatly reduced. Non-router nodes purely listen according to the first communication protocol, but do not send. And therefore, non-router nodes will not cause collisions in the sparse multi-hop network according to the first communication protocol. Although a data collector node sends data packets with aggregated status information or sensing data to a parent node according to the first communication protocol, such data packets are sent intermittently. Furthermore, because preferably the parent node is separated by a one-hop direct link from the data collector node, a reduced transmission power may be used to further reduce the potential interference from a data collector node to the sparse multi-hop network.

A parent node of a node assigned the third role, or the data collector node, is responsible to act as the interface between the data collector node and the network, which is the sparse multi-hop network according to the first communication protocol. Two-way communication is involved over the interface. In one direction, the parent node is to receive data from the end node, the data collector node, and to forward the data to the sparse multi-hop network. Preferably, when a node assigned the first role is the parent node of a node assigned the third role, the node assigned the first role is further configured to operate in the first mode to forward the aggregated status information received from the node assigned the third role to a next hop via multi-hop routing.

On the other hand, the parent node is responsible to deliver a control command from the sparse multi-hop network to the end node. When a node assigned the first role, the router node, is the parent node of a node assigned the third role, or a data collector node, the data collector node may switch to operate according to the first communication protocol to poll the parent once in a while to check if there is any control command available, although the inherent latency due to the polling mechanism is not most desirable.

In another example, a node assigned the second role is the parent node of a node assigned the third role, the node assigned the second role is further configured to operate in the second mode according to the first communication protocol when forwarding the aggregated status information received from the node assigned the third role to a node assigned the first role via the one-hop direct link. This can be beneficial if the link quality between a data collector node and a non-router node is much better than the link quality between the data collector node and a router node.

In one example, the point-to-point connection according to the second communication protocol can also be a point-to-multipoint connection. In a preferred setup, the second wireless communication protocol is in accordance with a Bluetooth Low Energy, BLE, standard. It is beneficial to make use of the easy setup of point-to-point or point-to-multipoint connection, such as BLE beacons, by a node assigned the second role to send status information to at least a node assigned the third role. Here we consider a point-to-point connection also covers a point-to-multipoint connection.

In another preferred setup, the first wireless communication protocol is in accordance with a Zigbee standard. Zigbee standard is widely adopted in home automation and lighting control applications. The Zigbee network layer natively supports both star and tree networks, and generic mesh networking. The powerful topology control provides it great flexibility in a control system, especially for reaching destination nodes that are far away from a source node with direct link.

In such a large and dense network, it might be the case that the plurality of nodes are a mix of legacy devices, which are capable to operate according to only one out of the two communication protocols, and more advanced devices, which are capable to operate according to both first and second communication protocols. Depending on the physical property of a certain node, a subset out of the three roles may be assigned as potential roles to that node.

In another embodiment, each node out of the plurality of nodes can be assigned any one out of the three roles.

In this preferred setup, each node out of the plurality of nodes is capable to operate according to both the first and the second communication protocols. And hence, any one of the three roles may be assigned to any one of the nodes as a result, identical nodes can be installed at a site and later configured.

In another preferred setup, the assignment of the roles to the plurality of nodes may also change over time. This added flexibility may be triggered when there is a failure of a single node, or link quality degradation of a certain connection due to noise or interference, or mobility of a certain node.

In one embodiment, a node out of the plurality of nodes assigned the second role is further configured to operate in the third mode when forwarding a received control command to a node out of the plurality of nodes assigned the third role by means of a point-to-point connection, upon receipt of the control command in the second mode.

Given that the node assigned the third role, or the data collector node, operates in the fourth mode most of the time, it may be a most efficient way to deliver the control command by a non-router node to the data collector node according to the second communication protocol. A control command may also be piggybacked on the same packet with status information or sensing data from the non-router node.

In another embodiment, a node assigned the second role is further configured to operate in the third mode when sending a notification to a node assigned the third role with a point-to-point connection, upon receipt of a control command in the second mode.

Considering the potential different security levels provided by the first and the second communication protocols, a node assigned the second role, or the non-router node, may not forward a control command directly to a node assigned the third role, or the data collector node, according to the second communication protocol. Instead, the non-router node may send a notification to the data collector node about the availability of a new control command from the sparse multi-hop network.

Preferably, the node assigned the third role is further configured to operate in a fifth mode according to the first communication protocol when polling the parent node for receiving the control command, upon receipt of the notification.

It is beneficial that the data collector will poll its parent node, most likely a router node, upon receipt of the notification from a non-router node. As compared to a conventional polling that is scheduled according to a regular time interval, such trigger-based polling provides lower latency, especially because control commands are normally sent out sporadically without a fixed rhythm.

In one embodiment, a node assigned the first role is further configured to operate in a sixth mode according to the second communication protocol when sending status information via a point-to-point connection.

A node assigned the first role, or the router node, may also comprise collocated devices, actuators, or sensors. In order to provide the status information and/or sensing data, the router node may operate according to the second communication protocol to deliver such information to the data collector node. And then the status information and/or sensing data from the router node, the non-router node, and the data collector node itself can be combined in a same packet.

In another example, a node assigned the first role, or the router node, may be configured to stay on the sparse multi-hop network all the time, according to the first communication protocol. Then, apart from forwarding data packets received from a data collector, which contain aggregated status information and/or sensing data, the router node may generate a separate packet for its own status information and/or sensing data, and forward the separate packet directly to a next hop via multi-hop routing. Alternatively, the router node may also piggyback its own status information and/or sensing data to the aggregated data received from the data collector node, and then forward the combined packet to a next hop via multi-hop routing.

Alternatively, when a router node is further configured to act as the parent node of a data collector node, the router node may also forward a control command to the data collector node directly in the sixth mode according to the second communication protocol. The router node may also send a notification about a control command to the data collector node in the sixth mode, to trigger the data collector node to switch to the first communication protocol to receive the control command.

Advantageously, a node assigned the second role is further configured to operate in a time-interleaved manner in both the second mode and the third mode, and the time spent in the second mode is longer than the time spent in the third mode.

For a node assigned the second role, the non-router node, it is important to receive the control commands in time, in order to reduce the execution latency experienced on the control network. Therefore, it is preferable for the non-router nodes to stay in the second mode longer than in the third mode.

Preferably, a node assigned the third role is further configured to operate in a time-interleaved manner in both the fourth mode and the fifth mode, and the time spent in the fourth mode is longer than the time spent in the fifth mode.

For a node assigned the third role, the data collector node, its main responsibility is to collect status information and/or sensing data from other nodes. Given that such information and/or data may be sent out any time by an individual node, it is beneficial for a data collector node to stay in the fourth mode most of its time to monitor the channel according to the second communication protocol.

Advantageously, the wireless control system is for lighting control, and/or for controlling sensors and gathering sensing data.

In a preferred setup, the wireless control system is for lighting control, and it can also be used to gather status information and sensing data from actuators and sensors collocated with the lights or located close to the lights. In another example, the wireless control system can also be a control system for building automation in offices or home, or for industrial control in a factory.

In a preferred setup of the wireless control system, within a one-hop direct link range of each of the nodes assigned the first role, at least one node out of the plurality of nodes is assigned the third role, and at least one node out of the plurality of nodes is assigned the second role, and wherein the at least one node assigned the second role is configured to receive in the second mode a control command from the node assigned the first role, and to send in the third mode the status information to the at least one node assigned the third role.

The efficiency of the disclosed system comes from the combination of the three separate roles cooperating in a dense network, with each individual node in the network assigned a single role. The router nodes build up a sparse multi-hop network according to the first communication protocol. Around each router node within a direct link range, there is a local star network built up by at least one non-router node and at least one data collector node. In a preferred setup, one node is assigned the third role, while a majority of the nodes in the direct link range of the router node are assigned the second role. Such arrangement further improves the efficiency of the system, in terms of reducing latency in delivering control commands, suppressing interference to the sparse multi-hop network, and reducing the overhead in sending data packets carrying status information and/or sensing data on the sparse multi-hop network.

Beneficially, the nodes, out of the plurality of nodes, assigned the first role, are selected to guarantee that all the nodes out of the plurality of nodes are within one-hop range of at least one node assigned the first role.

The star network with a one-hop direct link around each router node is constructed mainly to reduce interference and to improve the performance of the system. On a large scale of the wireless control system, it relies on the sparse multi-hop network to distribute control commands to and to collect sensing data from the plurality of nodes, especially for the nodes at the edge of the network. Therefore, the router nodes are selected to guarantee the connectivity of the system.

In accordance with a second aspect of the invention a node is provided. The node out of a plurality of nodes in a wireless control system, the node comprises a radio unit capable to operate according to both a first communication protocol capable to support a mesh or tree network with multi-hop routing, and a second communication protocol capable to support a star network with a point-to-point connection. The node also comprises a controller capable of controlling the node in accordance with any one out of three roles, the controller configured to control the node to perform an assigned role out of the three roles, the three roles being:
  a first role wherein the node is configured to operate in a first mode according to the first communication protocol wherein a routing capability of the node is enabled, and the node is operable to distribute a control command to the plurality of nodes and to forward status information from the plurality of nodes, via multi-hop routing;
  a second role wherein the node is configured to operate both in a second mode according to the first communication protocol wherein the routing capability of the node is disabled, and the node is operable to receive a control command broadcast by another node out of the plurality of nodes by means of a one-hop direct link; and in a third mode according to the second communication protocol, wherein the node is operable to send status information to one or more nodes out of the plurality of nodes; and
  a third role wherein the node is configured to operate both in a fourth mode according to the second communication protocol, wherein the node is operable to receive status information from one or more nodes by means of a point-to-point connection; and in a fifth mode according to the first communication protocol, wherein the node is operable to send aggregated status information, received in the fourth mode from the one or more nodes, to a parent node out of the plurality of nodes with a one-hop direct link; and wherein the parent node is a node assigned the first role or a node assigned the second role.

The radio unit can be a combo radio that supports both protocols, or a unit comprising two single mode radios, with each single mode radio supporting only one communication protocol. When both single mode radios operate in an overlapping spectrum, it is beneficial to make use of the time-interleaved manner to schedule the radio unit operating according to the first or the second wireless communication protocol.

In accordance to another aspect of the invention a method of a wireless control system is provided. The method comprises steps of operating the plurality of nodes according to at least one of a first communication protocol capable to support a mesh or tree network with multi-hop routing, and a second communication protocol capable to support a star network with a point-to-point connection. The method further comprises the steps of assigning one out of three roles to each node of the plurality of nodes, and assigning each of the three roles to at least one node out of the plurality of nodes, the three roles being:
  a first role wherein the node operating in a first mode according to the first communication protocol enabling routing capability, for distributing a control command to the plurality of nodes and forwarding status information from the plurality of nodes, via multi-hop routing;
  a second role wherein the node operating both in a second mode according to the first communication protocol disabling routing capability, for receiving a control command broadcast by another node out of the plurality of nodes by means of a one-hop direct link; and in a third mode according to the second communication protocol for sending status information to one or more nodes out of the plurality of nodes; and
  a third role wherein the node operating both in a fourth mode according to the second communication protocol for receiving status information from one or more nodes out of the plurality of nodes by means of a point-to-point connection; and in a fifth mode according to the first communication protocol for sending aggregated status information, received in the fourth mode from the one or more nodes, to a parent node out of the plurality of nodes with a one-hop direct link; and wherein the parent node is a node assigned the first role or a node assigned the second role.

In accordance to a further aspect of the invention a method of operating a node, out of a plurality of nodes in a wireless control system, is provided. The method comprises the node:
  operating according to both a first communication protocol capable to support a mesh or tree network with multi-hop routing, and a second communication protocol capable to support a star network with a point-to-point connection;
  performing a first role, when the first role being assigned to the node, by operating in a first mode according to the first communication protocol enabling the routing capability for distributing a control command to the plurality of nodes and forwarding status information from the plurality of nodes, via multi-hop routing;

performing a second role, when the second role being assigned to the node, by operating both in a second mode according to the first communication protocol disabling the routing capability, for receiving a control command broadcast by another node out of the plurality of nodes by means of a one-hop direct link; and in a third mode according to the second communication protocol for sending status information via the point-to-point connection; and performing a third role, when the third role being assigned to the node, by operating in a fourth mode according to the second communication protocol, for receiving status information from one or more nodes out of the plurality of nodes by means of a point-to-point connection; and in a fifth mode according to the first communication protocol, for sending aggregated status information, received in the fourth mode from the one or more nodes out of the plurality of nodes, to a parent node out of the plurality of nodes with a one-hop direct link; and wherein the parent node is a node assigned the first role or a node assigned the second role.

The invention may be embodied in a distributed computer program comprising code means which, when the program is executed by a plurality of nodes each comprising processing means, cause the processing means comprised in the plurality of nodes to perform the method according to the present invention in a collective manner.

The invention may further be embodied in a computer program comprising code means which, when the program is executed by a node comprising processing means, cause the processing means to perform the method according to the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
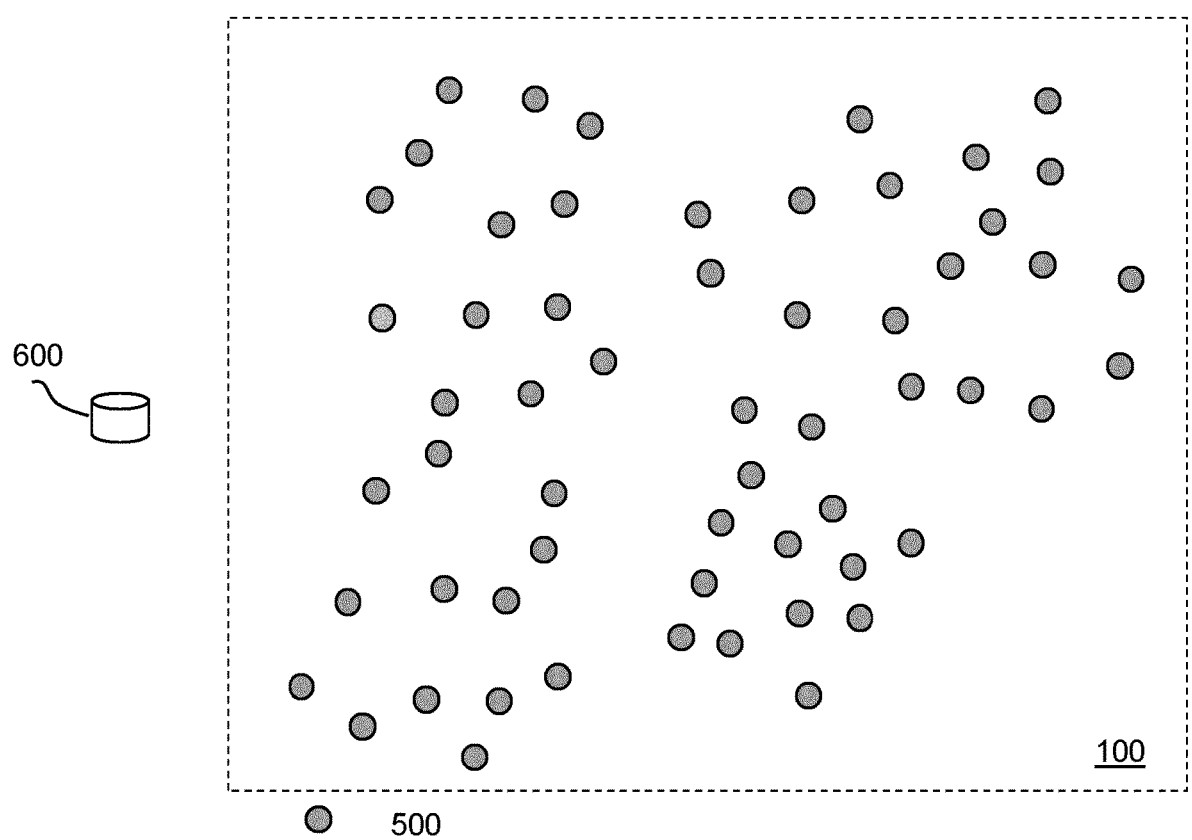
FIG. 1 demonstrates a wireless control system with a plurality of node having a high node density.

Various embodiments of the present invention will now be described based on a wireless control system 100 comprising a plurality of nodes 500, as shown in FIG. 1. The network can be a local network under the control of a local coordinator 600 to serve a certain control purpose. The network can also be connected to the cloud or a backbone network, via 600 a gateway, a bridge, or a router device. In a lighting context, a node 500 may be comprised in a lighting device, a luminaire, a sensor, an actuator, such as a switch to serve for the communication function of the lighting device, the luminaire, the sensor, or the switch. A node 500 may also be comprised in a HVAC system, a smart refrigerator, a smart oven, other smart white goods, or a remote controller in a broader building/home automation context.

Considering that the control system may comprise a large number of nodes, transmission from those nodes may conflict with each other, especially when they are deployed with a relatively high node density. A relatively high node density indicates that most of the nodes has more than one neighbour node in a one-hop direct communication range. The present invention aims to improve the efficiency and reliability of large-scale data distribution and collection in a wireless control system.

Figure 2:
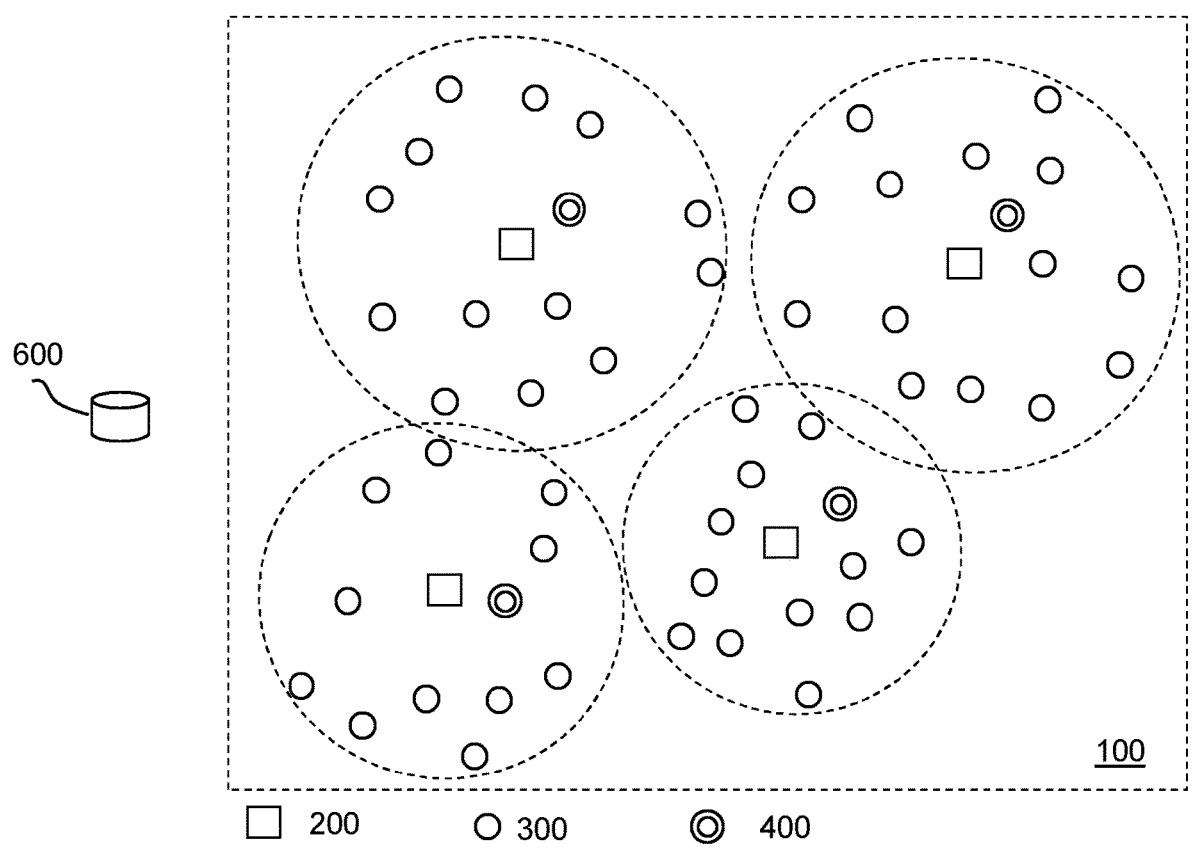
FIG. 2 demonstrates a wireless control system with each one of the plurality of nodes in the wireless control system assigned one role out of three roles.

To achieve this goal, the present invention proposes to assign each one of the plurality of nodes a dedicated role out of three possible roles, as demonstrated in FIG. 2. With a first role, the node is configured to operate as a router node 200 in a first mode according to the first communication protocol with the routing capability enabled. A router node 200 is operable to distribute a control command to the plurality of nodes 500 and to forward status information from the plurality of nodes 500, via multi-hop routing. Thus, router nodes build up a sparse multi-hop network according to the first communication protocol, which act as a kind of core network of the wireless control system. Around each router node with one-hop direct link, a local star network is built up, as indicated with a dash circle in FIG. 2. A star network comprises at least a node assigned a second role, as a non-router node 300, and at least a node assigned a third role, as a data collector node 400. A non-router node 300 is configured to operate both in a second mode according to the first communication protocol with the routing capability disabled, and the node is operable to receive a control command broadcasted by a router node with a one-hop direct link. The non-router node is also configured to operate in a third mode according to the second communication protocol to send status information and/or sensing data via a point-to-point connection to a data collector node 400. A data collector node 400 is configured to operate either in a fourth mode according to the second communication protocol to receive status information and/or sensing data from one or more nodes, which can be the router node 200 and/or multiple non-router nodes 300, with a point-to-point connection. To improve the efficiency in conveying the status information and/or sensing data, the data collector node 400 is configured to aggregate status information received from the one or more nodes in a combined data packet. Given that the overhead to transmit information, such as a packet header, is relatively fixed according to a certain commination protocol, it is more beneficial to maximize the payload part of a single packet, other than to send multiple small packets each with the same packet header but a short payload.

Figure 3:
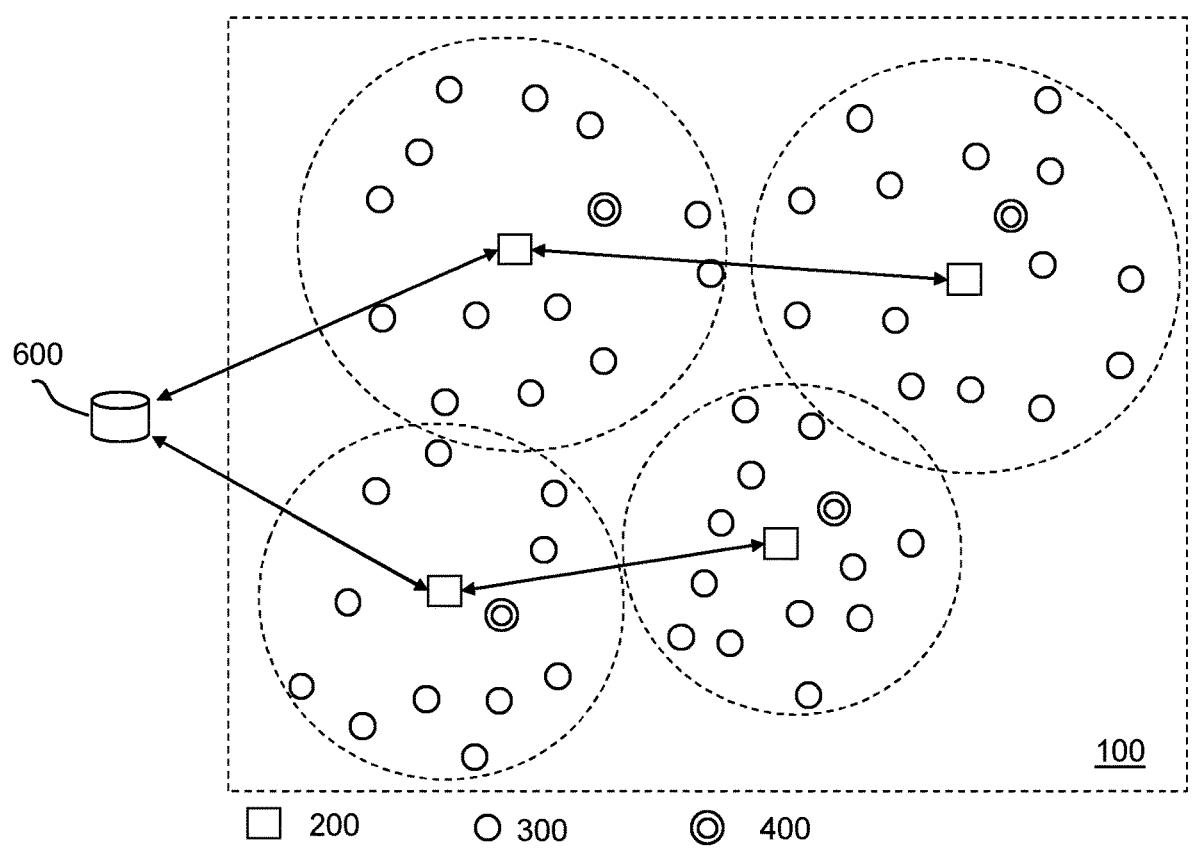
FIG. 3 demonstrates a wireless control system with multi-hop communication on the sparse network according to the first communication protocol.

FIG. 3 demonstrates bi-directional multi-hop communication on the sparse network according to the first communication protocol. The sparse multi-hop network comprises mainly the nodes assigned the first role, or the router nodes, and acts as the core network of the wireless control system. Thus, the router nodes bear the responsibility to guarantee the connectivity of the entire system, especially for the nodes that are far away from the central controller or the gateway. By making the wireless control system sparse in view of the first communication protocol, the mutual interference among neighbouring nodes is significantly suppressed. Reduced packet collisions and retransmissions also improve the efficiency of the system, in terms of both power consumption and latency.

Figure 4:
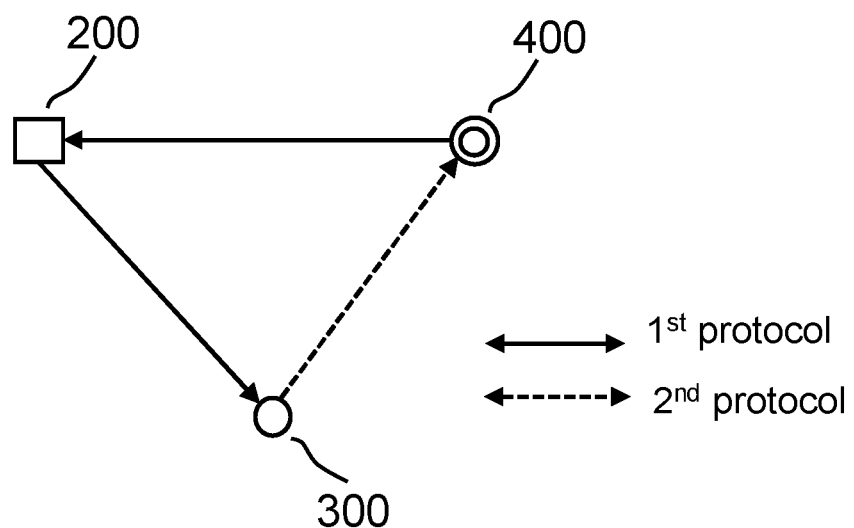
FIG. 4 depicts the communication in a star network around each of the node assigned the first role.

FIG. 4 depicts an example of the communication in a local star network around each of the nodes assigned the first role. The local star network is typically centred around a router node 200. Around the router node 200 within one-hop direct link, there is at least one non-router node 300 and a data collector node 400. In a preferred setup of the star network, one node acts as the data collector node 400, and the majority of the nodes act as non-router nodes. Depending on the connectivity of the star network, it is also possible to have more than one data collector node 400 per router node 200, in order to guarantee good connectivity to all the non-router nodes for collecting status information or sensing data.

In the star network, a non-router node 300 stays in the second mode according to the first communication protocol for most of its time, in order to detect a control command broadcasted by the router node 200 in a timely manner. After a certain time period, the non-router node sends its status information and/or collected sensing data to a data collector node according to the second communication protocol. A data collector node 400 monitors the channel according to the second communication protocol for another time interval to detect packets from one for more nodes, which are mainly non-router nodes 300, but may also be the router node 200. Then the data collector node assembles a new packet with aggregated status information and/or sensing data from other nodes and from itself, and then sends the new packet to the parent node according to the first communication protocol. Given that such a new packet is sent sporadically and may be with a reduced transmission power level, the interference from the data collector node 400 to the sparse multi-hop network can be negligible.

As indicated in FIG. 4, in a preferred setup, the router node 200 acts as the parent node of the data collector node 400, and the data collector node 400 sends the aggregated status information and/or sensing data to the router node directly. Since the data collector node 400 stays in the fourth mode according to the second communication protocol most of its time, the data collector node 400 may poll its parent node, the router node, once in a while to receive control commands. Polling may be combined with sending the aggregated status information and/or sensing data, and thus the number of switches between the first and the second communication protocols may be reduced. However, if a certain type of control commands should comply with a critical latency requirement, the data collector node 400 may have to poll the router node more frequently. Optionally, the router node 200 may forward a control command to the data collector node 400 in the sixth mode according to the second communication protocol. In another option, if additional security measures are taken to secure communications according to the first communication protocol, the router node 200 may send a notification to the data collector node 400 in the sixth mode according to the second communication protocol, and then the data collector node 400 switches to the first communication protocol to poll the router node 200, upon receipt of the notification from the router node 200. Alternatively, the router node 200 may broadcast/rebroadcast the control command according to the first communication protocol, after a certain time interval since the transmission of the notification according to the second communication protocol. And hence, the data collector node 400 may just switch to the first communication protocol to listen to the broadcasted control command.

Alternatively, a non-router node 300 may also act as the parent node of a data collector node 400. Then the non-router node 300 will take care of the communication between the data collector node 400 and the sparse multi-hop network. Upon receiving a control command, the non-router node 300 may forward the control command directly in the third mode according to the second communication protocol. Again, if additional security measures are taken to secure communications according to the first communication protocol, the non-router node 300 may just send a notification to the data collector node 400 about the control command, and then the data collector node 400 can be triggered to switch to the first communication protocol to poll the router node for receiving the command. Similarly, the data collector node 400 sends aggregated status information and/or sensing data to the non-router node 300 according to the first communication protocol, and then the non-router node 300 may forward the packet received from the data collector node to the router node according to the first communication protocol. In this case, the non-router node 300 acts as a relay node between the router node 200 and the data collector node 400, which is less efficient than the case that the data collector node 400 sends the aggregated status information and/or sensing data to the router node directly. However, it can be still beneficial in the scenario that the data collector node 400 is located relatively far from the router node 200 with the link quality of the direct link to the router node below a certain threshold, and by using a non-router node as a parent node for relaying, lower transmission power can be used according to the first communication protocol. Thus, the potential interference to the multi-hop routing in the sparse network can be further reduced.

The first wireless communication protocol is mainly to implement large scale information distribution and collection in a wireless control system with a plurality of nodes, whereas the control system can be used for lighting control and/or building automation. It is important that the first wireless communication protocol supports multi-hop routing, which can be Zigbee, Thread, Bluetooth Mesh, Wi-Fi mesh, WirelessHART, SmartRF, CityTouch, IP500, Z-wave, or any other mesh or tree-based technology.

It is preferred that the second wireless communication protocol is in accordance with a Bluetooth low energy, BLE, standard. It can also be Wi-Fi direct, Zigbee Inter-PAN, Zigbee Touchlink, or another wireless communication standard that favours an easy setup for point-to-point connection.

When the two communication systems according to the first and the second communication protocols may use different frequency plans and time scheduling, the plurality of nodes are split among the two systems with a certain role assigned. Thus, mutual interference among neighbouring nodes may be reduced significantly.

Figure 5:
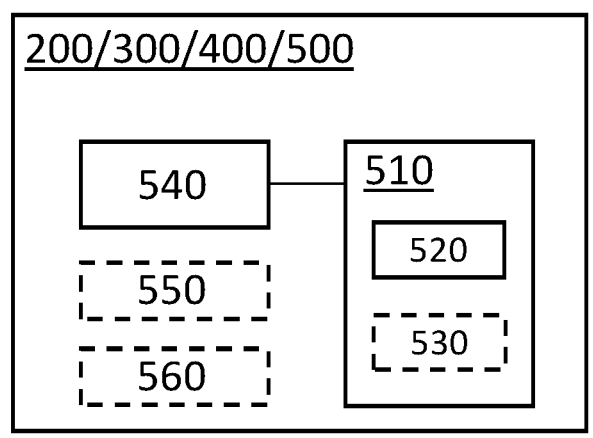
FIG. 5 schematically depicts basic components of a node out of the plurality of nodes in a wireless control system.

FIG. 5 schematically depicts basic components of a node out of the plurality of nodes 200, 300, 400, 500 in a wireless control system 100. The node 200, 300, 400, 500 comprises a radio unit 510, which is capable to operate according to at least one or both of a first communication protocol capable to support a mesh or tree network with multi-hop routing, and a second communication protocol capable to support a star network with a point-to-point connection. The radio unit 510 may be a combo device 520 to support both the first and the second communication protocols and operate in a time-interleaved manner according to either one of the two communication protocols. The radio unit 510 may comprise two separate single mode transceivers 520, 530, and each supports one communication protocol. The radio unit 510 may comprise at least a single mode transceiver 520 to support the first communication protocol. The node 200, 300, 400, 500 further comprises a controller 540, which is configured to control the node to perform an assigned one out of the three roles.

Optionally, the node 200, 300, 400, 500 may further comprise an application controller and/or an actuator, as indicated by 550 in FIG. 5. The application controller or the actuator may be related to the control functionality of the node either in a lighting context or a broader building automation context. The application controller and/or an actuator may execute the control commands received by the node. And the status information is provided by the application controller and/or the actuator as a feedback to the control system.

In another option, the node 200, 300, 400, 500 may further comprise a sensor, as indicated by 560 in FIG. 5. The sensor 560 may be configured to detect presence and/or environmental information, such as temperature, humidity, etc. The sensing data may be collected in addition to or independent from the status information of the node, or the application controller and/or the actuator.

Depending on the physical property of a certain node, which may support only one communication protocol as a legacy device or support both communication protocol as a more advanced combo device, only a subset out of the three roles or all the three roles may be assigned to that node.

Figure 6:
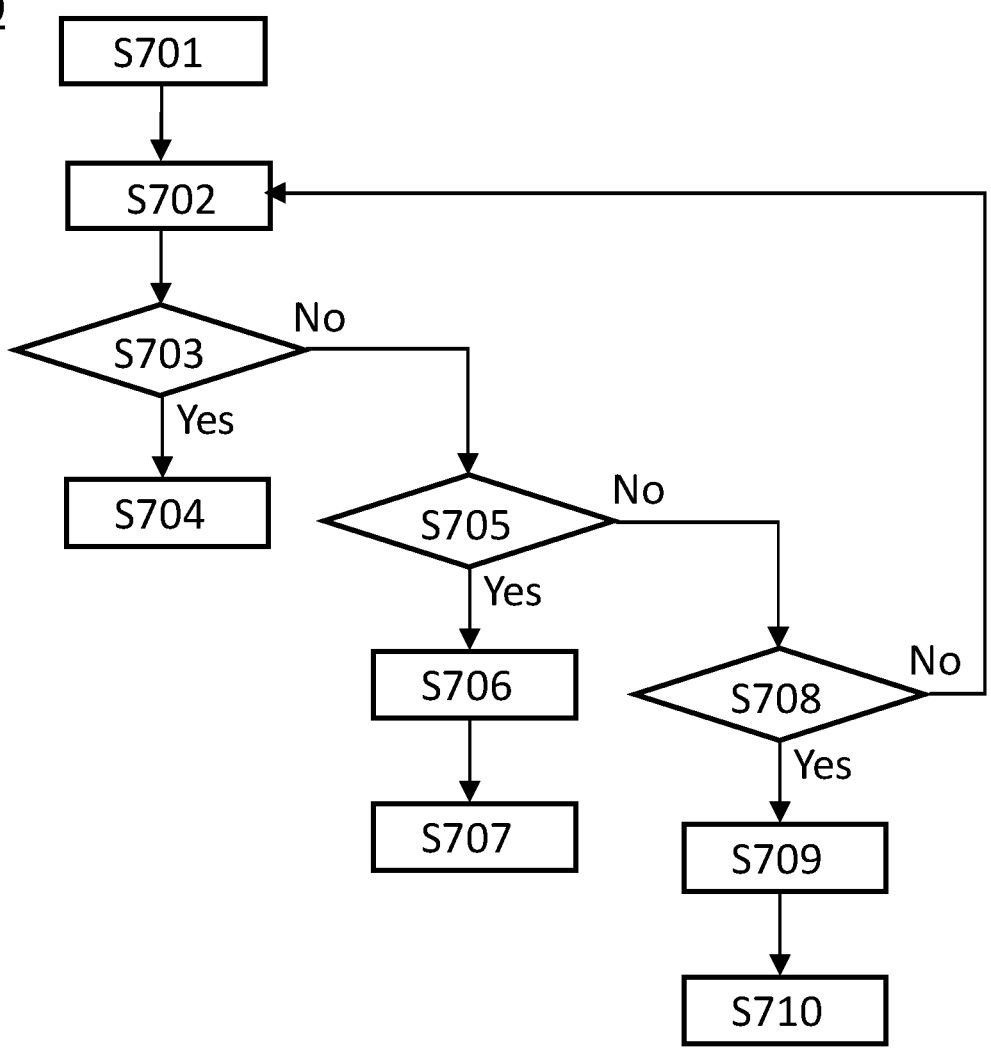
FIG. 6 shows a flow diagram of a method of a wireless control system.

FIG. 6 shows a flow diagram of a method 700 of a wireless control system. The method 700 comprises the step S701 of operating a node, out of the plurality of nodes, according to at least one of a first communication protocol capable to support a mesh or tree network with multi-hop routing, and a second communication protocol capable to support a star network with a point-to-point connection. The method 700 further compromises the step S702 of assigning the node to one out of three roles. In step S703, it is checked if the node is assigned the first role; if yes, the method 700 comprises the step S704 to operate the node as a router node 200, and in a first mode the router node is operated according to the first communication protocol enabling routing capability, for distributing a control command to the plurality of nodes and forwarding status information from the plurality of nodes, via multi-hop routing. If the node is not assigned the first role, it is further checked in step S705 if the node is assigned the second role, as a non-router node 300. If yes, in step S706, the node is configured to operate in a second mode according to the first communication protocol disabling routing capability, for receiving a control command broadcasted by a node with a one-hop direct link; and in step S707, the node is configured to operate in a third mode according to the second communication protocol for sending status information via a point-to-point connection. If the node is not assigned the second role, it is further checked in step S708 if the node is assigned the third role, as a data collector node 400. If yes, in step S709, the node is configured to operate in a fourth mode according to the second communication protocol for receiving status information from one or more nodes with a point-to-point connection; and in step S710, the node is configured to operate in a fifth mode according to the first communication protocol for sending aggregated status information received from the one or more nodes in the fourth mode, to a parent node with a one-hop direct link. The parent node of a data collector node 400 is preferred to be a router node 200 but can also be a non-router node 300. The example shown in FIG. 6 is merely exemplary, while another variation may be that a single check is made to verify which role is assigned, instead of using three sequential checks S703, S704, and S705.

Figure 7:
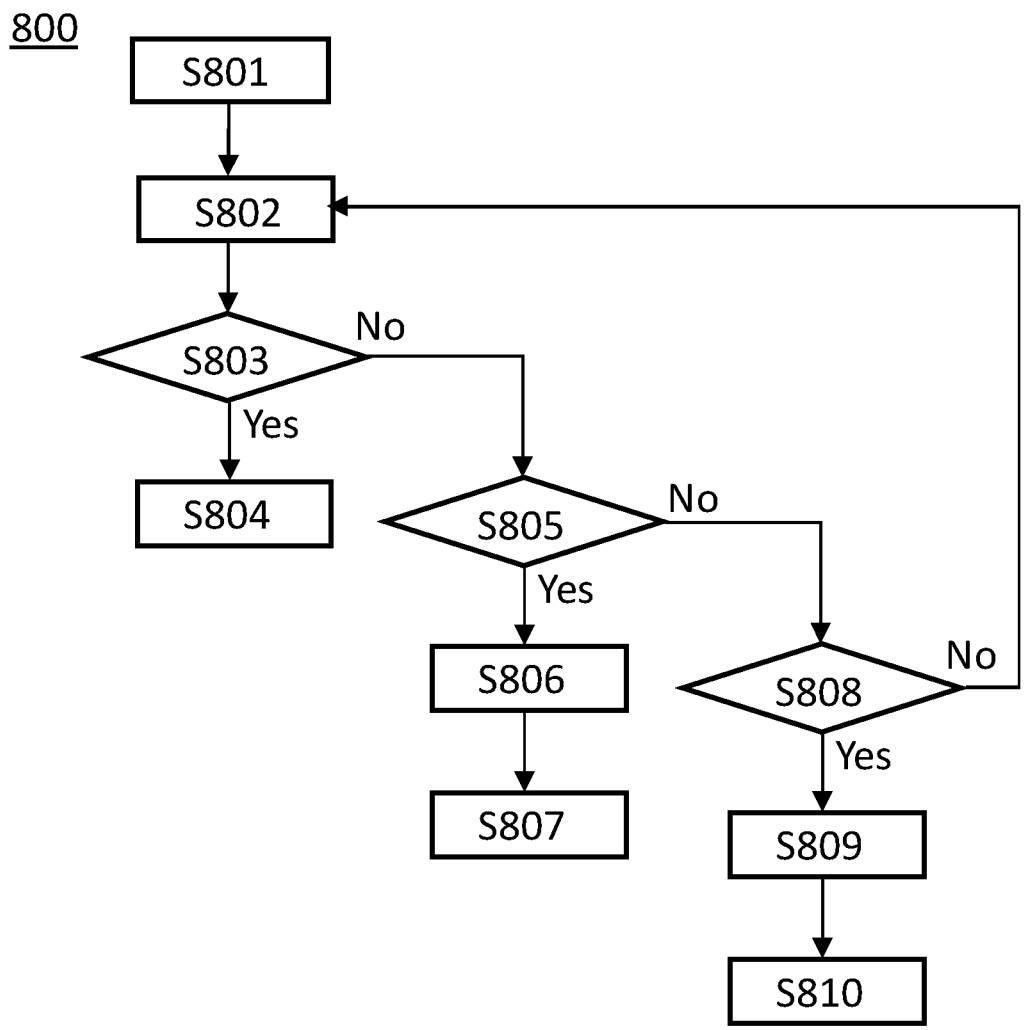
FIG. 7 shows a flow diagram of a method carried out by a node out of a plurality of nodes in a wireless control system.

FIG. 7 shows a flow diagram of a method 800 carried out by a node out of a plurality of nodes in a wireless control system. In step S801, the method 800 comprises the node operating according to both a first communication protocol capable to support a mesh or tree network with multi-hop routing, and a second communication protocol capable to support a star network with a point-to-point connection. The method 800 further compromises the node performs an assigned one out of three roles, in step S802. In step S803, it is checked if the assigned role is the first role; if yes, the method 800 comprises the step S804 that the node operates as a router node 200, and in a first mode the router node is operated according to the first communication protocol enabling routing capability, for distributing a control command to the plurality of nodes and forwarding status information from the plurality of nodes, via multi-hop routing. If the assigned role is not the first role, it is further checked in step S805 if the assigned role is the second role, as a non-router node 300. If yes, in step S806, the node is configured to operate in a second mode according to the first communication protocol disabling routing capability, for receiving a control command broadcasted by a node with a one-hop direct link; and in step S807, the node is configured to operate in a third mode according to the second communication protocol for sending status information via a point-to-point connection. If the assigned role is not the second role, it is further checked in step S808 if the assigned role is the third role, as a data collector node 400. If yes, in step S809, the node is configured to operate in a fourth mode according to the second communication protocol for receiving status information from one or more nodes with a point-to-point connection; and in step S810, the node is configured to operate in a fifth mode according to the first communication protocol for sending aggregated status information received from the one or more nodes in the fourth mode, to a parent node with a one-hop direct link. Same as FIG. 6, the example shown in FIG. 7 is merely exemplary.

Note that the methods as depicted in FIG. 6 and FIG. 7 may be executed recursively on a regular basis or repeated upon a trigger event, such as a failure of a single node, or link quality degradation of a certain connection due to noise or interference, or mobility of a certain node.

The method according to the present invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer or a processing means comprised in a node or a network or a commissioning device as disclosed in the above-described embodiments.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. A wireless control system comprising:
a plurality of nodes configured to operate according to at least one of:
a first communication protocol capable to support a mesh or tree network with multi-hop routing;
a second communication protocol capable to support a star network with a point-to-point connection;
and wherein each node of the plurality of nodes is assigned one out of three roles, and each of the three roles is assigned to at least one node out of the plurality of nodes, the three roles comprising:
a first role wherein the node is configured to operate
in a first mode according to the first communication protocol wherein a routing capability of the node is enabled, and the node is operable to distribute a control command to the plurality of nodes and to forward status information received from the plurality of nodes, via multi-hop routing;
a second role wherein the node is configured to operate both
in a second mode according to the first communication protocol wherein the routing capability of the node is disabled, and the node is operable to receive a control command broadcast by another node out of the plurality of nodes by means of a one-hop direct link; and
in a third mode according to the second communication protocol, wherein the node is operable to send status information to one or more nodes out of the plurality of nodes; and
a third role wherein the node is configured to operate both
in a fourth mode according to the second communication protocol, wherein the node is operable to receive status information from one or more nodes out of the plurality of nodes by means of a point-to-point connection; and
in a fifth mode according to the first communication protocol, wherein the node is operable to send aggregated status information, received in the fourth mode from the one or more nodes, to a parent node out of the plurality of nodes by means of a one-hop direct link; and wherein the parent node is a node assigned the first role or a node assigned the second role.

2. The wireless control system of claim 1, wherein each node out of the plurality of nodes can be assigned any one out of the three roles.

3. The wireless control system of claim 1, wherein a node out of the plurality of nodes assigned the second role is further configured to operate in the third mode when forwarding a received control command to a node out of the plurality of nodes assigned the third role by means of a point-to-point connection, upon receipt of the control command in the second mode.

4. The wireless control system of claim 1, wherein a node out of the plurality of nodes assigned the second role is further configured to operate in the third mode when sending a notification to a node out of the plurality of nodes assigned the third role by means of a point-to-point connection, upon receipt of a control command in the second mode.

5. The wireless control system of claim 4, wherein the node out of the plurality of nodes assigned the third role is further configured to operate in the fifth mode according to the first communication protocol when polling the parent node for receiving the control command, upon receipt of the notification.

6. The wireless control system of claim 1, wherein a node out of the plurality of nodes assigned the first role is further configured to operate in a sixth mode according to the second communication protocol when sending status information to one or more nodes out of the plurality of nodes.

7. The wireless control system of claim 1, wherein a node out of the plurality of nodes assigned the second role is further configured to operate in a time- interleaved manner in both the second mode and the third mode, and the time spent in the second mode is longer than the time spent in the third mode.

8. The wireless control system of claim 1, wherein a node out of the plurality of nodes assigned the third role is further configured to operate in a time- interleaved manner in both the fourth mode and the fifth mode, and the time spent in the fourth mode is longer than the time spent in the fifth mode.

9. The wireless control system of claim 1, the wireless control system is for lighting control, and/or for controlling sensors and gathering sensing data.

10. The wireless control system of claim 1, wherein within a one-hop direct link range of each of the nodes assigned the first role, at least one node out of the plurality of nodes is assigned the third role, and at least one node out of the plurality of nodes is assigned the second role, and
wherein the at least one node assigned the second role is configured to receive in the second mode a control command from the node assigned the first role, and to send in the third mode the status information to the at least one node assigned the third role.

11. The wireless control system of claim 10, wherein the nodes, out of the plurality of nodes, assigned the first role, are selected to guarantee that all the nodes out of the plurality of nodes are within one-hop range of at least one node assigned the first role.

12. A node out of a plurality of nodes in a wireless control system, the node comprising:
a radio unit capable to operate according to both:
a first communication protocol capable to support a mesh or tree network with multi-hop routing, and
a second communication protocol capable to support a star network with a point-to-point connection; and
a controller capable of controlling the node in accordance with any one out of three roles, the controller configured to control the node to perform an assigned role out of the three roles, the three roles comprising:
a first role wherein the node is configured to operate
in a first mode according to the first communication protocol wherein a routing capability of the node is enabled, and the node is operable to distribute a control command to the plurality of nodes and to forward status information from the plurality of nodes, via multi-hop routing;
a second role wherein the node is configured to operate both
in a second mode according to the first communication protocol wherein the routing capability of the node is disabled, and the node is operable to receive a control command broadcast by another node out of the plurality of nodes by means of a one-hop direct link; and
in a third mode according to the second communication protocol, wherein the node is operable to send status information to one or more nodes out of the plurality of nodes; and
a third role wherein the node is configured to operate both
in a fourth mode according to the second communication protocol, wherein the node is operable to receive status information from one or more nodes by means of a point-to-point connection; and
in a fifth mode according to the first communication protocol, wherein the node is operable to send aggregated status information, received in the fourth mode from the one or more nodes, to a parent node out of the plurality of nodes with a one-hop direct link; and wherein the parent node is a node assigned the first role or a node assigned the second role.

13. A method of operating a wireless control system comprising a plurality of nodes, the method comprising the steps of operating the plurality of nodes according to at least one of a first communication protocol capable to support a mesh or tree network with multi-hop routing, and a second communication protocol capable to support a star network with a point-to-point connection;
and wherein the method further comprising the steps of assigning one out of three roles to each node of the plurality of nodes, and assigning each of the three roles to at least one node out of the plurality of nodes, the three roles comprising:
a first role wherein the node operating
in a first mode according to the first communication protocol enabling routing capability, for distributing a control command to the plurality of nodes and forwarding status information from the plurality of nodes, via multi-hop routing;
a second role wherein the node operating both
in a second mode according to the first communication protocol disabling routing capability, for receiving a control command broadcast by another node out of the plurality of nodes by means of a one-hop direct link; and
in a third mode according to the second communication protocol for sending status information to one or more nodes out of the plurality of nodes; and
a third role wherein the node operating both
in a fourth mode according to the second communication protocol for receiving status information from one or more nodes out of the plurality of nodes by means of a point-to-point connection; and
in a fifth mode according to the first communication protocol for sending aggregated status information, received in the fourth mode from the one or more nodes, to a parent node out of the plurality of nodes with a one-hop direct link; and wherein the parent node is a node assigned the first role or a node assigned the second role.

14. A non-transitory distributed computing program comprising code which, when the program is executed by a plurality of nodes, cause the plurality of nodes to perform the method of claim 13 in a collective manner.

15. A method of operating a node out of a plurality of nodes in a wireless control system, the method comprising the node:
operating according to both a first communication protocol capable to support a mesh or tree network with multi-hop routing, and a second communication protocol capable to support a star network with a point-to-point connection;
performing a first role, when the first role being assigned to the node, by operating:
in a first mode according to the first communication protocol enabling the routing capability for distributing a control command to the plurality of nodes and forwarding status information from the plurality of nodes, via multi-hop routing;
performing a second role, when the second role being assigned to the node, by operating both:
in a second mode according to the first communication protocol disabling the routing capability, for receiving a control command broadcast by another node out of the plurality of nodes by means of a one-hop direct link; and
in a third mode according to the second communication protocol for sending status information via the point-to-point connection; and
performing third role, when the third role being assigned to the node, by operating:
in a fourth mode according to the second communication protocol, for receiving status information from one or more nodes out of the plurality of nodes by means of a point-to-point connection; and
in a fifth mode according to the first communication protocol, for sending aggregated status information, received in the fourth mode from the one or more nodes out of the plurality of nodes, to a parent node out of the plurality of nodes with a one-hop direct link; and wherein the parent node is a node assigned the first role or a node assigned the second role.

16. A non-transitory computing program comprising code which, when the program is executed by a node, cause the node to perform the method of claim 15.

* * * * *